United States Patent
Matsumoto

(10) Patent No.: US 8,397,166 B2
(45) Date of Patent: Mar. 12, 2013

(54) IMAGE PROCESSING APPARATUS FOR DETERMINING AN OPERATION TRAJECTORY BASED ON AN OPERATION BY A USER AND FOR PERFORMING A DESIGNATED PROCESS ON IMAGES BASED ON THE DETERMINED OPERATION TRAJECTORY

(75) Inventor: Kosuke Matsumoto, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 394 days.

(21) Appl. No.: 12/570,368

(22) Filed: Sep. 30, 2009

(65) Prior Publication Data
US 2010/0083117 A1   Apr. 1, 2010

(30) Foreign Application Priority Data
Sep. 30, 2008 (JP) ................. 2008-252014

(51) Int. Cl.
*G06F 3/00* (2006.01)
*G06F 3/033* (2006.01)
(52) U.S. Cl. ............... 715/731; 715/863; 345/179
(58) Field of Classification Search .......... 715/731, 715/764, 825, 863; 345/173, 179
See application file for complete search history.

(56) References Cited

U.S. PATENT DOCUMENTS

| | | | | |
|---|---|---|---|---|
| 5,592,608 A * | 1/1997 | Weber et al. | ........ | 715/863 |
| 5,796,406 A * | 8/1998 | Shigematsu et al. | ........ | 715/863 |
| 6,954,282 B2 * | 10/2005 | Miyamoto et al. | ........ | 358/1.18 |
| 7,158,675 B2 * | 1/2007 | Gounares et al. | ........ | 382/187 |
| 7,535,460 B2 * | 5/2009 | Momose | ........ | 345/173 |
| 7,554,530 B2 * | 6/2009 | Mizobuchi et al. | ........ | 345/173 |
| 7,637,813 B2 * | 12/2009 | Katayama et al. | ........ | 463/31 |
| 2003/0063133 A1 * | 4/2003 | Foote et al. | ........ | 345/850 |
| 2005/0159223 A1 * | 7/2005 | Tahara et al. | ........ | 463/43 |
| 2006/0094502 A1 * | 5/2006 | Katayama et al. | ........ | 463/31 |
| 2006/0125828 A1 * | 6/2006 | Harrison et al. | ........ | 345/441 |
| 2006/0132456 A1 * | 6/2006 | Anson | ........ | 345/173 |
| 2006/0197763 A1 * | 9/2006 | Harrison et al. | ........ | 345/441 |

(Continued)

FOREIGN PATENT DOCUMENTS

JP   11-259502 A   9/1999
JP   2007-158603 A   6/2007

OTHER PUBLICATIONS

Rubine, Dean, Specifying Gestures by Example, Information Technology Center, Carnegie Mellon University, Pittsburgh, PA, Computer Graphics, vol. 25, No. 4, Jul. 1991.*

(Continued)

*Primary Examiner* — Kieu Vu
*Assistant Examiner* — James T Durkin
(74) *Attorney, Agent, or Firm* — Holtz, Holtz, Goodman & Chick, PC

(57) ABSTRACT

With a map displayed on a displaying apparatus 6, a user touches a touch panel 16 with his or her finger to draw an operation trajectory passing through his or her desired area on the map. A user's designated area is specified based on the operation trajectory. Images shot in the designated area are automatically selected to be displayed and the order of displaying the images is set in accordance with a drawing operation of the operation trajectory such that the image shot at a shooting spot closest to the start point of the operation trajectory is displayed first and the image shot at a shooting spot closest to the end point of the operation trajectory is displayed last. The image selecting operation and the image displaying order setting operation can be easily performed at the same time.

15 Claims, 12 Drawing Sheets

U.S. PATENT DOCUMENTS

| | | | |
|---|---|---|---|
| 2007/0035639 A1* | 2/2007 | Aridome et al. | 348/231.3 |
| 2007/0118430 A1* | 5/2007 | Wiseman et al. | 705/26 |
| 2008/0159718 A1* | 7/2008 | Kuroiwa et al. | 386/124 |
| 2008/0184173 A1* | 7/2008 | Sutanto et al. | 715/863 |
| 2009/0115862 A1* | 5/2009 | Andersson | 348/222.1 |
| 2009/0254841 A1* | 10/2009 | Balaishis et al. | 715/753 |

OTHER PUBLICATIONS

Harris, Craig, Kirby Canvas Curse, Jun. 10, 2005 retrieved from the Internet at http://www.ign.com/articles/2005/06/10/kirby-canvas-curse on Oct. 26, 2012.*

* cited by examiner

FIG.5

| LIST NO. | IMAGE FILE NAME | |
|---|---|---|
| 1 | FILE 115<br>FILE 117<br>FILE 153<br>FILE 183<br>FILE 186<br>⋮ | ⎬ 301a |
| 2 | ⋮ | ⎬ 301b |
| 3 | ⋮ | ⎬ 301c |

| LIST NO. | IMAGE FILE NAME | |
|---|---|---|
| 1 | FILE 073<br>FILE 074<br>FILE 075<br>⋮ | ~301a |
| 2 | FILE 115<br>FILE 117<br>FILE 153<br>⋮ | ~301b |
| 3 | FILE 001<br>FILE 002<br>FILE 003<br>⋮ | ~301c |

# IMAGE PROCESSING APPARATUS FOR DETERMINING AN OPERATION TRAJECTORY BASED ON AN OPERATION BY A USER AND FOR PERFORMING A DESIGNATED PROCESS ON IMAGES BASED ON THE DETERMINED OPERATION TRAJECTORY

BACKGROUND OF THE INVENTION

1. Field of the Invention

The present invention relates to an image processing apparatus, a process order setting method and a program for setting a process order.

2. Description of the Related Art

A technique in a digital camera is disclosed in Japanese Patent 2007-158603 A, which records plural images in a memory, and displays a map on a display screen, and allows a user to touch the map displayed on the display screen to designate an area on the map, whereby images shot within the area are automatically selected from the recorded images and then a series of selected images are displayed on the display screen. In other words, the selected images are sequentially displayed each for a predetermined period. The technique allows the user of the digital camera to select in a simple manner only the image shot in the designated area for the purpose of displaying on the display screen.

In the technique, when the plural images are displayed, these images are displayed simply in the order of shooting date and time from the oldest to the latest. Even though plural images shot within the designated area can be selected but the technique has a disadvantage that the user is not allowed to specify the order in which the selected images are displayed.

SUMMARY OF THE INVENTION

According to one aspect of the invention, there is provided an image processing apparatus with a function of performing a predetermined process on images, shooting locations of which can be specified, the apparatus which comprises a map displaying unit having a display screen, for displaying a map on the display screen, an area specifying unit for allowing a user to perform a drawing operation to draw an operation trajectory on the map displayed on the display screen of the map displaying unit and for specifying a designated area based on the operation trajectory drawn on the display screen by the user, a target image setting unit for setting plural images shot within the designated area specified by the area specifying unit as target images to be subjected to a predetermined process, and a process order setting unit for setting an order of processing the target images set by the target image setting unit in accordance with the drawing operation that is performed by the user to draw the operation trajectory on the display screen of the map displaying unit.

According to another aspect of the invention, there is provided a process order setting method in an image processing apparatus with a function of performing a predetermined process on images, shooting locations of which can be specified, and a function of displaying data on a display screen, which method comprises displaying a map on the display screen, specifying a designated area based on an operation trajectory drawn on the map on the display screen in response to a drawing operation performed by a user, setting plural images shot within the specified designated area as target images to be subjected to a predetermined process, and setting an order of processing the target images in accordance with the drawing operation that is performed by the user to draw the operation trajectory on the display screen.

According to still another aspect of the invention, there is provided a computer readable recording medium mounted on an image processing apparatus provided with a built-in computer, the image processing apparatus further having a function of performing a predetermined process on images, shooting locations of which images can be specified, and a function of displaying data on a display screen, the computer readable recording medium storing a computer program when executed to make the built-in computer execute the steps which comprises displaying a map on the display screen, specifying a designated area based on an operation trajectory drawn on the map on the display screen in response to a drawing operation performed by a user, setting plural images shot within the specified designated area as target images to be subjected to a predetermined process, and setting an order of processing the target images in accordance with the drawing operation that is performed by the user to draw the operation trajectory on the display screen.

BRIEF DESCRIPTION OF THE DRAWINGS

FIG. 5 is a view schematically illustrating target lists produced in a target image selecting process.

FIG. 11 is a view schematically illustrating plural target lists 301a, 301b, and 301c produced in the selection display mode and corresponding to appropriate trace lines 202a, 202b, 202c shown in FIG. 10C, respectively.

DETAILED DESCRIPTION OF THE PREFERRED EMBODIMENTS

Now, preferred embodiments of the invention will be described with reference to the accompanying drawings.

[First Embodiment]

Figure 1:
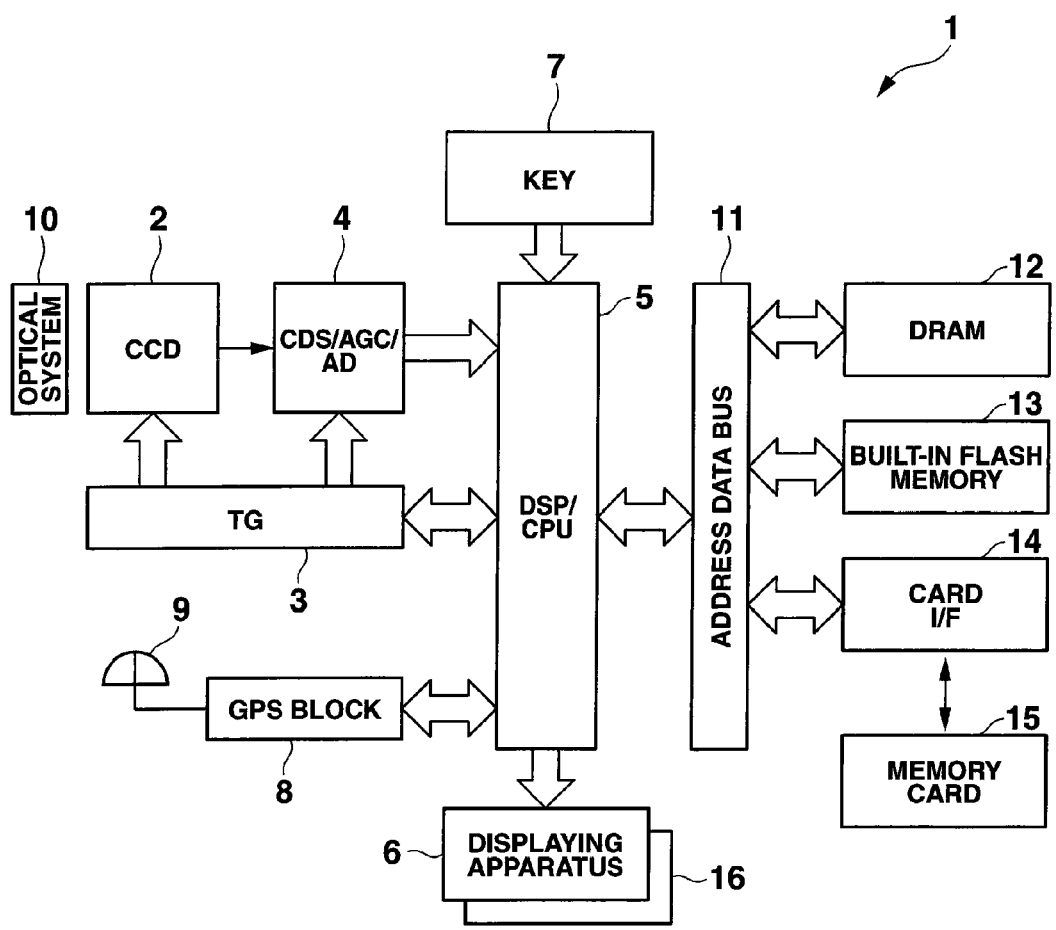
FIG. 1 is a block diagram illustrating a circuit configuration of a digital camera according to the present invention.

FIG. 1 is a block diagram showing an electric configuration of a digital camera 1 including an image displaying apparatus according to the invention. As shown in FIG. 1, the digital camera 1 according to the embodiment of the invention has an optical system block 10 and CCD 2, wherein the optical system block 10 comprises a lens group making up a focus lens and a zoom lens and a driving circuit for driving the lens group, and CCD 2 serves to convert an optical image of an object focused through the lens group into an image pick-up signal.

CCD 2 is driven in accordance with a driving signal generated by a TG (Timing Generator) to shoot the object, thereby generating an image pick-up signal. The generated image pick-up signal is supplied to an analog signal processing circuit 4. The analog signal processing circuit 4 comprises CDS for holding the image pick-up signal entered thereto, and an automatic gain control amplifier (AGC) for amplifying the image pick-up signal, and A/D converter for converting the amplified image pick-up signal into a digital image pick-up signal. The digital image pick-up signal is supplied from the analog signal processing circuit 4 to DSP/CPU 5.

DSP/CPU 5 comprises one chip micro-computer having various sorts of digital signal processing functions including an image data compression/expansion process, and controls operations of various parts of the digital camera. Further, DSP/CPU 5 includes an internal time counter having a calendar function.

DSP/CPU 5 is connected with a displaying apparatus 6, key input unit 7 and GPS block 8. Further, DRAM 12, a built-in flash memory 13, and a card interface are connected to DSP/CPU 5 through an address data bus 11. A memory card 15 is connected with the card interface 14, which card is detachably installed into a card slot (not shown) provided in a camera body of the digital camera 1.

DRAM 12 serves as a buffer memory for temporarily storing image data of the object, which has been picked-up and digitized by CCD 2, and further serves as a working memory of DSP/CPU 5. The image data temporarily stored in DRAM 12 is subjected to various image processes by DSP/CPU 5 in a shooting stand-by state in a recording mode, and further supplied to the displaying apparatus 6. In a shooting operation, the image data is subjected to a compression process, that is, the image data is encoded by DSP/CPU 5, and is finally converted into a still image file in data format conforming to Exif format and recorded in the memory card 15, wherein the still image file is added with attribute information including a model name of a camera, shooting date and time, shooting locations (latitude and longitude), shooting conditions, etc.

Figure 2:
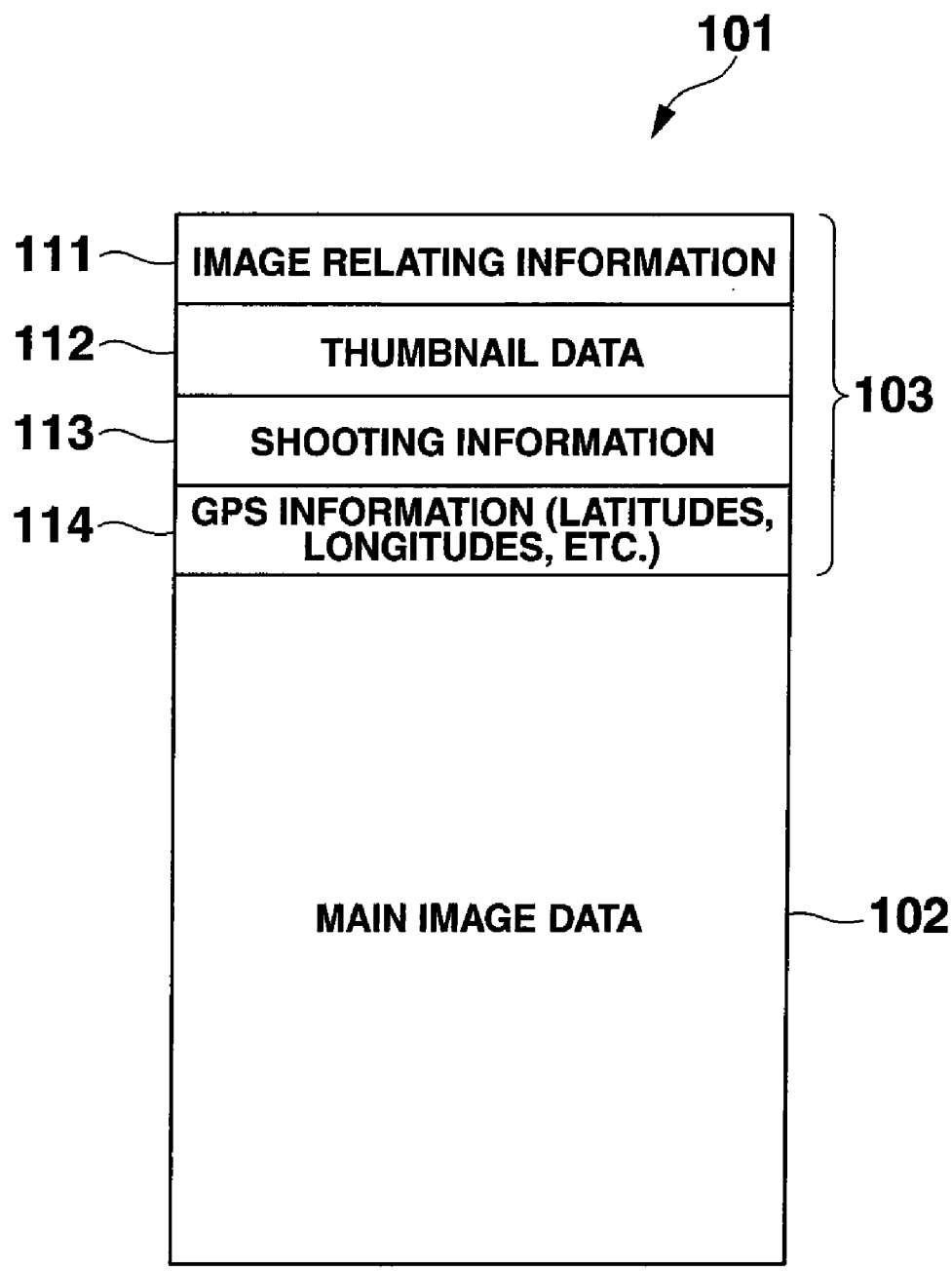
FIG. 2 is a view schematically showing a structure of image data.

FIG. 2 is a view schematically illustrating a data structure of the image data (still image file) 101 to be recorded in the memory card 15. The image data 101 substantially comprises main image data (compressed and encoded image data) 102 and image additional data 103. Further, the image additional data 103 comprises image relating information 111 including data such as a manufacturer name, camera model number, etc., thumbnail data 112, shooting information 113, and GPS information 114 including shooting locations (latitudes and longitudes). The shooting information 113 consists mainly of shooting conditions including an exposure time, F value, focus distance, shooting date and time, and a manufacturer's specific note (not shown).

The displaying apparatus 6 comprises a color LCD and a driving circuit. The displaying apparatus 6 serves as displaying means for displaying a through image of the object picked-up by CCD 2 in the shooting stand-by state, and for displaying an image read from the memory card 15 and expanded by DSP/CPU 5 in a reproducing mode. The key input unit 7 has plural operation keys (control keys) including a power key, mode key, shutter key, zoom key, MENU key, cursor key, set key, etc. The mode key is used to set an operation mode such as the recording mode and reproducing mode. When the key input unit 7 is operated by a user, an appropriate key input signal is supplied to DSP/CPU 5.

In addition to the plural operation keys, a tough panel 16 is provided on a display screen of the displaying apparatus 6 in an integrated fashion. The tough panel 16 is, for example, of a capacitance type, and is used as drawing means in the embodiment of the invention, which detects a position on the display screen where the user touches with his or her finger, and supplies to DSP/CPU 5 a detection signal indicating the position touched by the user with his or her finger.

GPS block 8 serves as position information obtaining means in the embodiment of the invention. GPS block 8 comprises a control circuit for demodulating and reading C/A codes (GPS data) of L1 band received from GPS satellite through GPS antenna 9 to calculate a latitude and longitude of the current location, a memory storing geodesic data essential for calculating the latitude and longitude, and a time counting circuit for counting a local time with accuracy, at which an electromagnetic wave is to be received from GPS satellite. GPS block 8 sends DSP/CPU 5 positioning data such as the latitude and longitude of the current location. The data of calculated latitude and longitude is recorded in the still image file as position information indicating a shooting position.

In the built-in flash memory 13 are secured an image data recording area, a program data recording area, and a setting data recording area. Image data is recorded in the image data recording area, which data is obtained by a shooting operation performed with no memory card 15 installed in the camera body 15. In the program data recording area are recorded various sorts of control programs and data necessary for DSP/CPU 5 to control operation of the digital camera 1. The control programs include programs necessary for AE control (Automatic Exposure Control) and AF control (Auto-Focus Control), and a process order setting program for making DSP/CPU 5 function as map displaying means, area specifying means, target image setting means, process order setting means, process controlling means, and trace-line display controlling means.

Further, in the program data recording area is recorded map data of plural areas, each covering a different range, which will be used in processes to be described later. The setting data recording area is for recording various sorts of setting data relating to operations of the digital camera 1. Data set by the user and re-written data of those automatically set, including target lists to be described later are recorded in the setting data recording area. In the present embodiment, the built-in flash memory 13 is used as target-list recording means of the invention.

In the digital camera 1 having the configuration described above, a selection display mode is prepared as a sub-mode of the reproducing mode, in which sub-mode only specific images are selected from images recorded in the memory card 15, and are displayed. When the selection display mode is set, DSP/CPU 5 will operate as described below.

Figure 3:
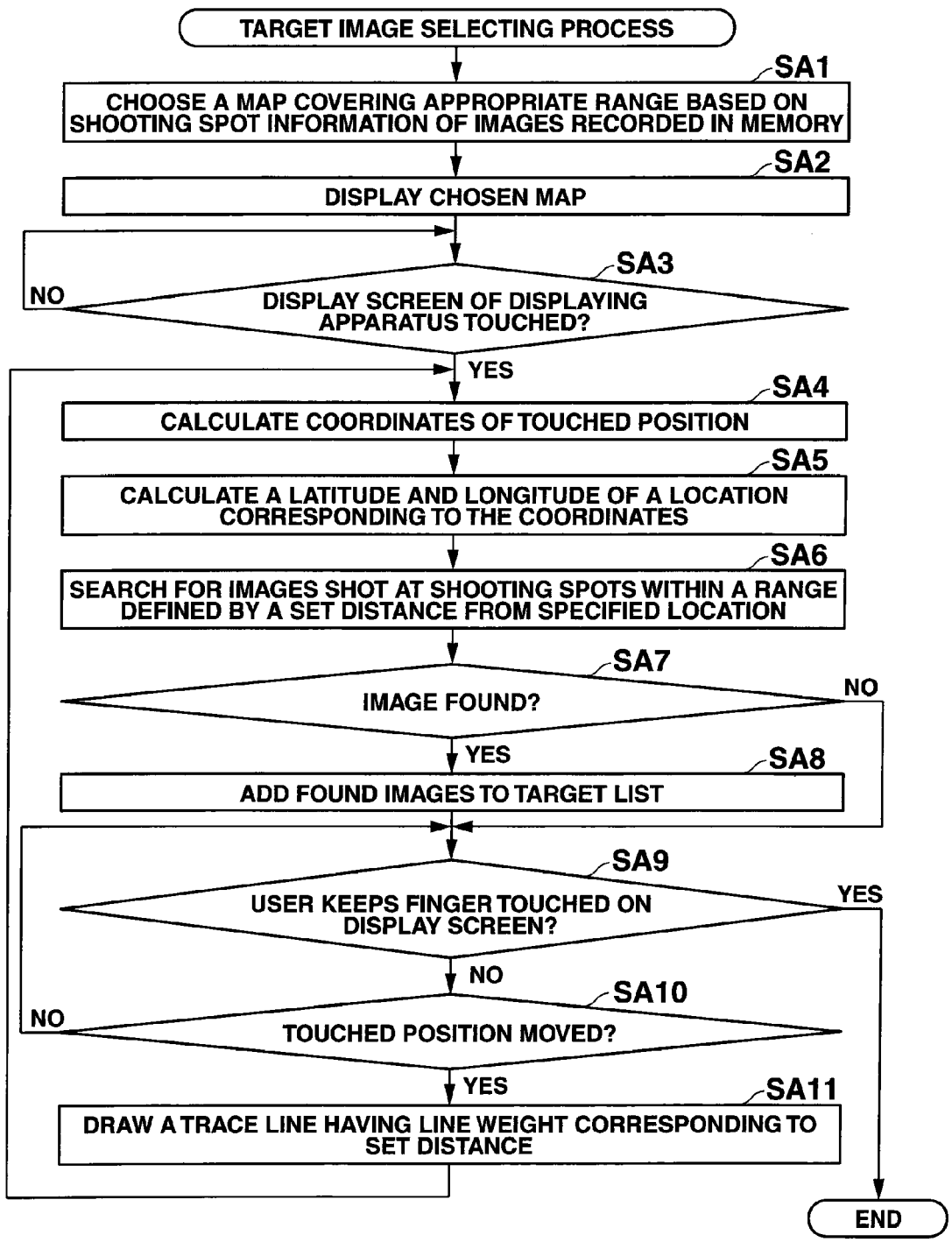
FIG. 3 is a flow chart of a target image selecting process to be performed by DSP/CPU 5 in a selection display mode in a first embodiment.

FIG. 3 is a flow chart of a target image selecting process, which is performed by DSP/CPU 5 to select images (target images) to be displayed, when the user executes a key manipulation to select the target images. In the target image selecting process, DSP/CPU 5 reads all the GPS information attached to the images recorded in the memory card 15 (or GPS information attached to images in a designated holder or GPS information attached to images of designated shooting date and time), and determines or chooses at step SA1 a map covering an appropriate range including all the shooting spots of all the images. Further, DSP/CPU 5 reads data (map data) of the chosen map from the built-in flash memory 13 (program data recording area) and displays the map data on the displaying apparatus 6 at step SA2.

DSP/CPU 5 judges at step SA3 whether or not the display screen of the displaying apparatus 6 has been touched by the user with his or her finger. When the display screen of the displaying apparatus 6 has been touched by the user (YES at step SA3), DSP/CPU 5 calculates coordinates corresponding to a position on the display screen touched by the user at step SA4. Further, DSP/CPU calculates a latitude and longitude of a specific location corresponding to the coordinates at step SA5, and then searches for images having GPS information indicating shooting spots falling within a range defined by a set distance from the specific location (step SA6). The distance is previously set in accordance with the whole area covered by the map that is displayed on the displaying apparatus 6 and is used to determine the range to be searched through having the center at the touched position. For example, the wider area the map covers, the loner the distance becomes.

When the image searched for at step SA6 has been found at step SA7 (YES at step SA7), DSP/CPU 5 adds such found image to a target list at step SA8. In other words, a target-list recording area is secures in the setting data recording area of the built-in flash memory 13, and a file name of the image is recorded in the target-list recording area. When plural images have been found at step SA7, the file names of the images are recorded in the target-list recording area in the order of shooting date from the oldest to the latest based on information of shooting date and time. When no image has been found at step SA7 (NO at step SA7), DSP/CPU 5 skips the process at step SA8 and advances to step SA9.

DSP/CPU 5 judges at step SA9 whether or not the user keeps his or her finger touched on the display screen of the displaying apparatus 6. When the user keeps his or her finger touched on the display screen of the displaying apparatus 6 (NO at step SA9), DSP/CPU 5 judges at step SA10 whether or not the touched position has moved on the display screen of the displaying apparatus 6. When the touched position has moved on the display screen of the displaying apparatus 6 (YES at step SA10) DSP/CPU 5 draws a trace line indicating a trace of movement of the touched position and having a line weight corresponding to the set distance on the display screen of the displaying apparatus 6 at step SA11, and then returns to step SA4.

As far as the user keeps his or her finger touched on the display screen of the displaying apparatus 6 (NO at step SA9), DSP/CPU 5 repeatedly performs the processes at steps SA4 to SA11, whereby every time the touched position moves continuously, images shot at shooting spots falling within an area defined in response to the movement of the touched position are successively added to the target list, and the trace line is renewed on the display screen of the displaying apparatus 6. When the user keeps his or her finger off the display screen of the displaying apparatus 6 (YES at step SA9), DSP/CPU 5 ceases the first target image selecting process for selecting target images.

During a period starting from a time when the user touches somewhere on the display screen of the displaying apparatus 6 with his or her finger to a time when the user keeps his or her finger off the display screen, one drawing operation is continuously performed to draw one trace line, and with respect to one drawn trace line, one target list is produced and recorded in the setting data recording area (target-list recording area) of the built-in flash memory 13.

In the target image selecting process (in the flow chart of FIG. 3), movement in the touched position is successively confirmed during one continuous drawing operation, but even though an interval is made long between confirmations of the movement in the touched position, because of a low processing speed of CPU, an intermediate touched position is interpolated to search for images, whereby images shot within the whole continuous area on the map corresponding to one trace line are set to be processed.

Figure 4:
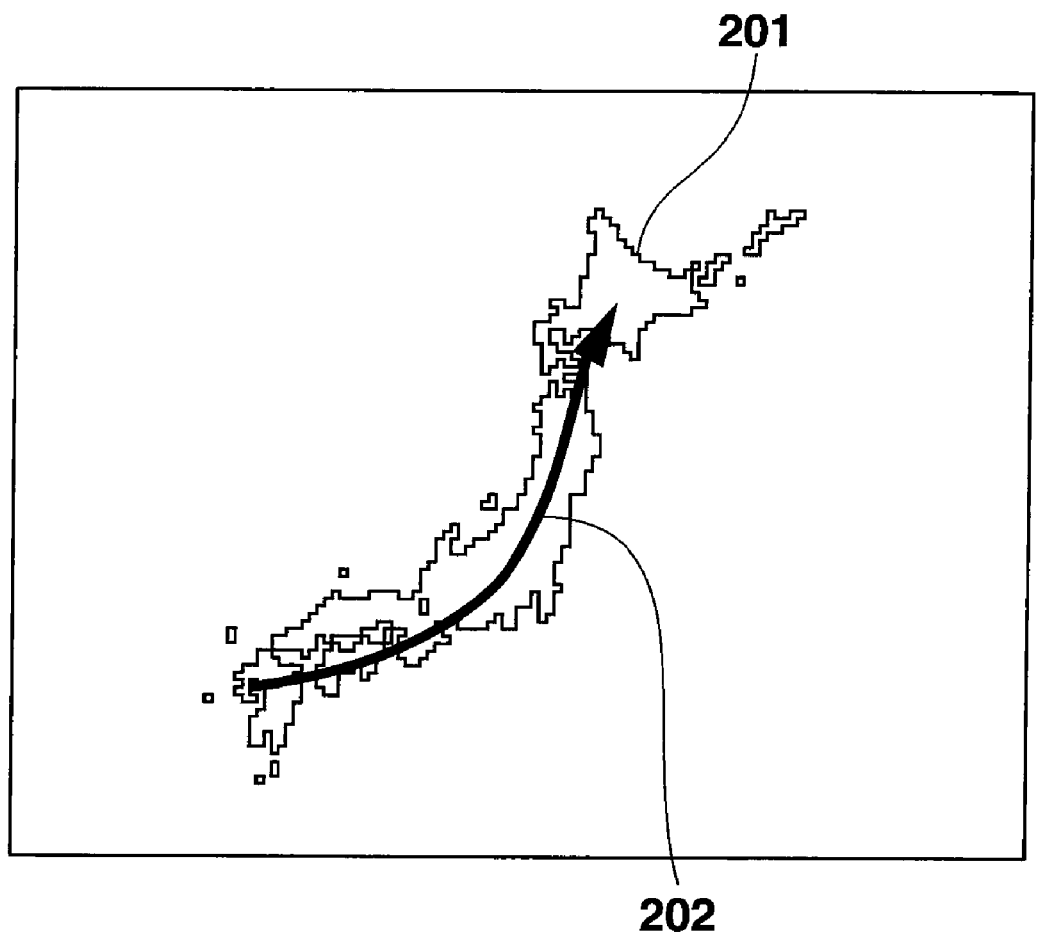
FIG. 4 is a view illustrating an example of an image displayed on a displaying apparatus 6 when target images have been selected by a user.

FIG. 4 is a view illustrating an example of an image which is displayed on the display screen of the displaying apparatus 6 when the first target image selecting process for selecting target images has ceased. FIG. 4 is a view illustrating a map 201 of Japan excluding its southern part (Okinawa Area) with a trace line 202 running through the Japanese Archipelago from Kyushu to the central part of Hokkaido. In other words, the case is shown in FIG. 4, where the area within the range substantially covering the whole Japanese Archipelago is set by the user.

Every time the target image selecting process has been performed, DSP/CPU 5 records a separate target list in the setting data recording area (target-list recording area) of the built-in flash memory 13. FIG. 5 is a view schematically illustrating target lists recorded in the setting data recording area of the built-in flash memory 13. Every time the target image selecting process is performed, a target list is produced. As the result, plural target lists 301$a$, 301$b$, 301$c$, . . . , are produced separately. Each target list is designated by a list number and consists of plural image files. In the present embodiment, the order in which the image files are recorded in the target list indicates the order in which images are displayed. For example, the target list 301$a$ of the list number "1" is recorded, when an area is designated by the trace line 202 shown in FIG. 4. The image file name "File 115" recorded in the first place has a display order of "1" and corresponds to an image shot at a shooting spot falling within the range defined by the set distance from the position corresponding to the starting point (in Kyushu) of the trace line 202. DSP/CPU 5 holds one or plural produced target lists in the built-in flash memory 13 as far as the selection display mode is set.

Figure 6:
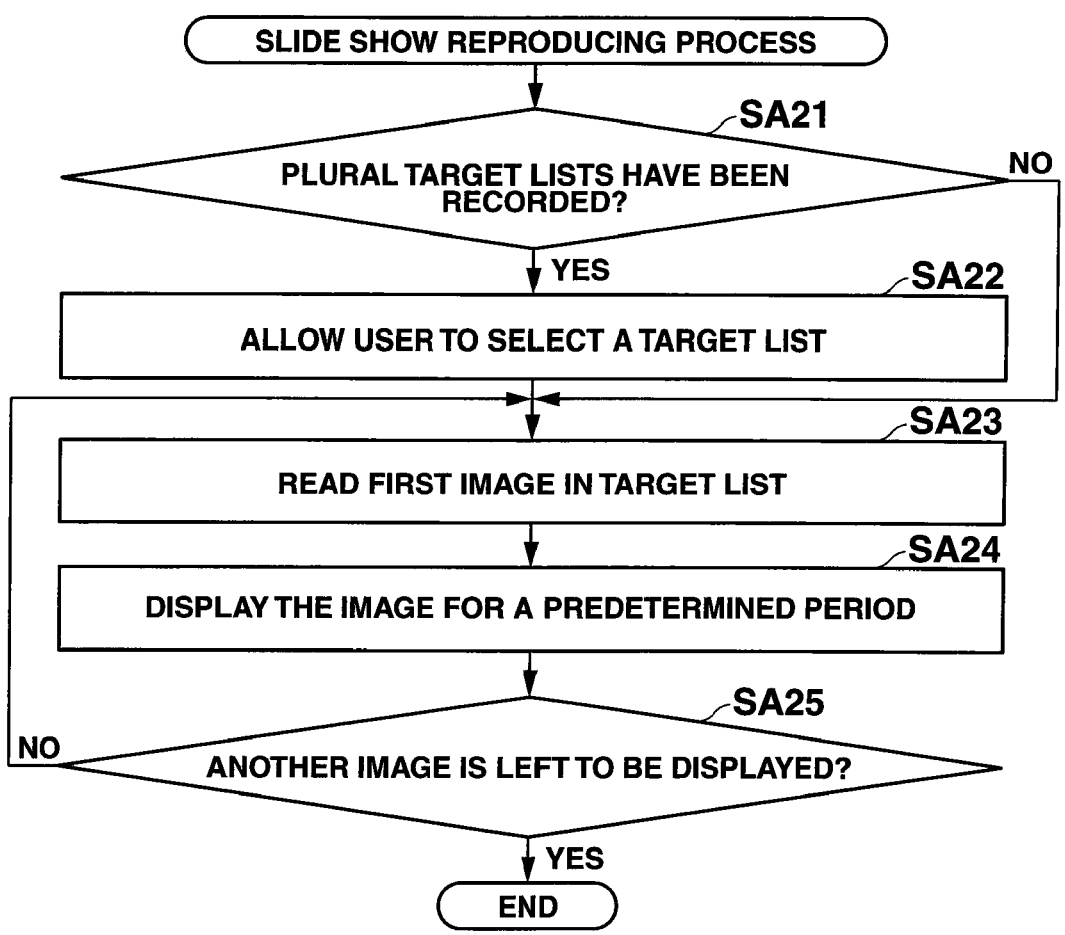
FIG. 6 is a flow chart of a slide show reproducing process to be performed by DSP/CPU 5 in the selection display mode in the first embodiment.

In the present embodiment, when the user operates the key input unit 7 in the selection display mode to perform a slide show reproducing operation, DSP/CPU 5 performs a slide show reproducing process in accordance with the flow chart shown in FIG. 6.

In the slide show reproducing process, DSP/CPU 5 judges at step SA21 whether or not plural target lists have been produced and recorded in the built-in recording memory 13 in the target image selecting process for selecting target images. When plural target lists are recorded in the built-in recording memory 13 (YES at step SA21), the user is allowed to select his or her desired target list from the plural target lists at step SA22. At step SA22, DSP/CPU 5 reads from the memory card 15 thumbnail data of the image recorded in the first place of each of the plural target lists and displays on the displaying apparatus 6 thumbnail images based on the thumbnail data in the order of the list number, thereby allowing the user to select his or her desired thumbnail image by operating the key input unit 7. When only a single target list is recorded in the built-in recording memory 13 (NO at step SA21), DSP/CPU 5 skips the process at step SA22 and displays that effect on the displaying apparatus 6, casing the slide show reproducing process (not shown).

When the user's desired target list has been selected at step SA22, DSP/CPU 5 reads from the memory card 15 image data recorded in the first place (first displaying order) of the selected target list at step SA23, and displays the image data (whole image) on display screen of the displaying apparatus 6 for a predetermined period at step SA24. After the predetermined period has lapsed, DSP/CPU 5 judges at step SA25 whether or not another image data to be displayed is left in the target list. When another image data is left in the target list (YES at step SA25), DSP/CPU 5 returns to step SA23, where DSP/CPU 5 reads and displays the image data for a predetermined period (step SA24).

Thereafter, as far as any image data is left to be displayed in the selected target list, DSP/CPU 5 repeatedly performs the processes at step SA23 and SA24, and when it is determined at step SA25 that no image data to be displayed is left in the selected target list, DSP/CPU 5 ceases the slide show reproducing process.

In the embodiment described above, when the selection display mode is set, the user can easily select as target images only the images shot at his or her specified area from images recorded in the memory card 15 simply by drawing with his or her finger a trace line connecting desired spots on the map displayed on the display screen of the display apparatus 6. The order of displaying target images is automatically set in accordance with the shooting spots of the target images and also in accordance with a drawing process of the trace line. Therefore, the user is allowed to set the order of displaying target images by choosing one end of the trace line as the beginning point or finishing point of drawing the trace line. The user can easily set the order of displaying target images and select the target images at the same time.

In the embodiment, the trace line 202 has been described, both ends of which do not meet together, and which does not cross itself a time on the display screen of the displaying apparatus 6. But the trace line may cross itself a time or two, and may be a closed line.

In the embodiment, when the user draws a trace line to select target images, the user traces a line on the display screen of the displaying apparatus 6 with his or her finger or a pen, but other method may be used to draw the trace line. For example, though manipulation may be more complex compared with the present embodiment, a trance line may be drawn by designating its starting point and ending point, or plural drawing points making up the trace line to be drawn. In this case, the touch panel 16 can be removed. If an input device such as a mouse can be connected or used in the image processing apparatus, such input device may be used to draw the trace line. The trace-line drawing operation described above may be applied to a second embodiment to be described below.

In the embodiment, the user uses the touch panel 16 to draw a trace line, but such a touch panel may be used that can detect a writing pressure applied thereon when the trace line is drawn, and a wider trace line is drawn when a higher writing pressure is applied thereon. In the target image selecting process for selecting target images (FIG. 3), when images are searched for at step SA6, which have GPS information indicating shooting spots falling within the range defined by the set distance from the specific location, modification may be made that the set distance is made larger when a higher writing pressure is applied and is made smaller when a lower writing pressure is applied. Since the range for selecting target images is defined by the set distance, the range can be easily changed depending on variation in writing pressure applied on the display screen of the displaying apparatus 6. Confirming variation in the range, the user can change the writing pressure on the display screen to alter a width of the trace line, whereby user friendliness of the apparatus is improved.

It is not necessary for the width of the trace line to be drawn to be equivalent to the set distance for searching for target images. If it is previously determined that the set distance is equivalent to five times of the width of the trace line, it will be convenient for the user to understand the relationship between the width of the trace line and the set distance.

In the modification, when the user sets a slide show display in the selection display mode, DSP/CPU 5 performs the slide show reproducing process to successively display images selected as target images by the user in the order of displaying designated by the user (slide show display). But in the selection display mode, a list of target images may be displayed in the displaying order specified in response to demand of the user.

Further modification may be made that, in response to a request of the user, DSP/CPU 5 selects user's desired image from the list of target images displayed on the display screen and displays the selected images (whole image display) on the display screen of the displaying apparatus 6. If all the target images cannot be displayed on the display screen at one time, the target images may be scrolled for display in response to the user's key operation.

When the list of target images is displayed as described above, each target image is associated with appropriate coordinates data and recorded in the built-in flash memory 13, wherein the appropriate coordinates data corresponds to the touched position on the display screen calculated at step SA4.

Figure 7:
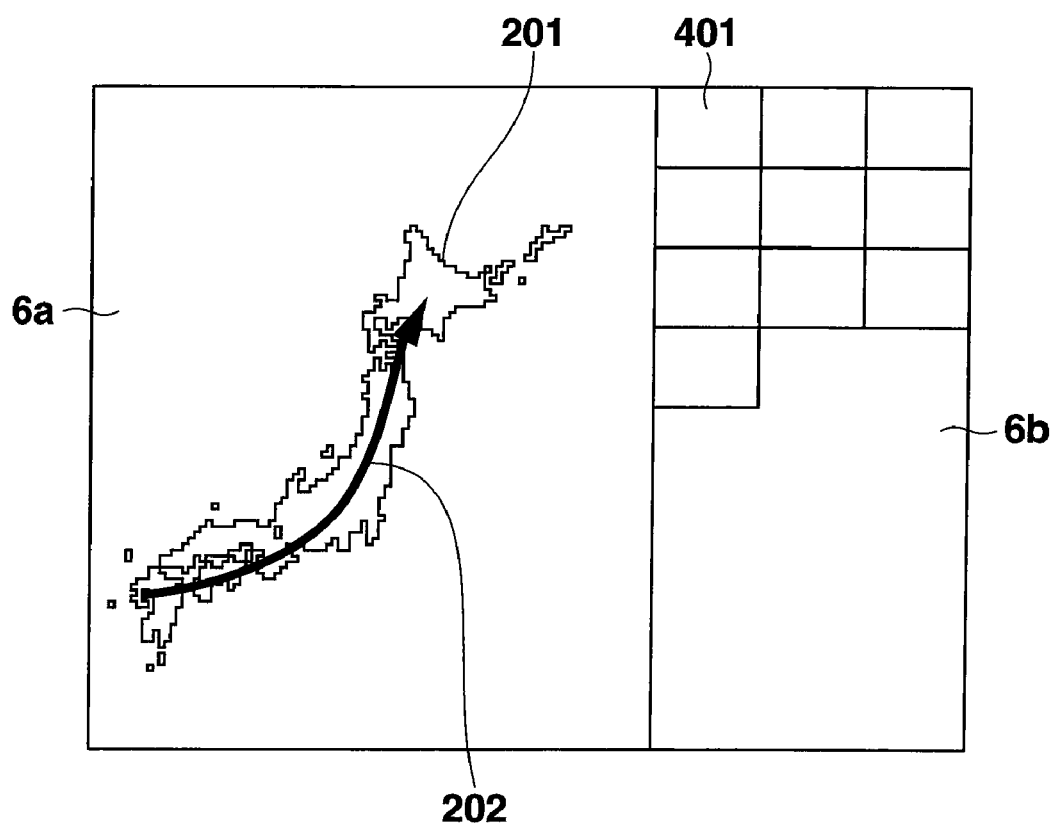
FIG. 7 is a view illustrating an example of a display screen of a displaying apparatus 6 that is divided into a map displaying area 6a and an image displaying area 6b.

When the user demands displaying the list of the target images, DSP/CPU 5 reads a target list or a target list that is selected from plural target lists by the user, together with corresponding coordinates data. DSP/CPU 5 divides the display screen of the displaying apparatus 6 into a map displaying area 6a and an image displaying area 6b as shown in FIG. 7. And then DSP/CPU 5 displays the map 201 and trance line 202 in the map displaying area 6a in the same manner as in the target image selecting process and further displays a list of target images 401 reduced in size in the image displaying area 6b. Every time another trace line has been drawn by the user, the list of target images is updated and is replaced with new list of images corresponding to the another trace line. Thumbnail image data 112 and/or images increased or decreased in size may be displayed in place of the list of images 401.

In the embodiment, in response a request from the user in the selection display mode, DSP/CPU 5 performs the target image selecting process (FIG. 3) to produce and record a target list in the built-in flash memory 13. In response to the user's request for displaying target images, DSP/CPU 5 performs the slide show reproducing process (FIG. 6), wherein a series of target images written in arbitrary target list are displayed. In the embodiment, after the target image selecting process has been performed in response to the user's request, a series of target images written in the arbitrary target list may be displayed without waiting for the user's request.

[Second Embodiment]

The second embodiment of the digital camera according to the invention will be described. The digital camera of the second embodiment has the same electric configuration as illustrated in FIG. 1. The selection display mode is prepared in the digital camera, in which mode, immediately after performing the target image selecting process in response to the user's request, as described above, DSP/CPU 5 performs the target image displaying process. In the program data recording area of the built-in flash memory 13 is recorded an image display program for, when executed, making DSP/CPU 5 function as judging means for performing a process in the selection display mode as will be described below.

Figure 8:
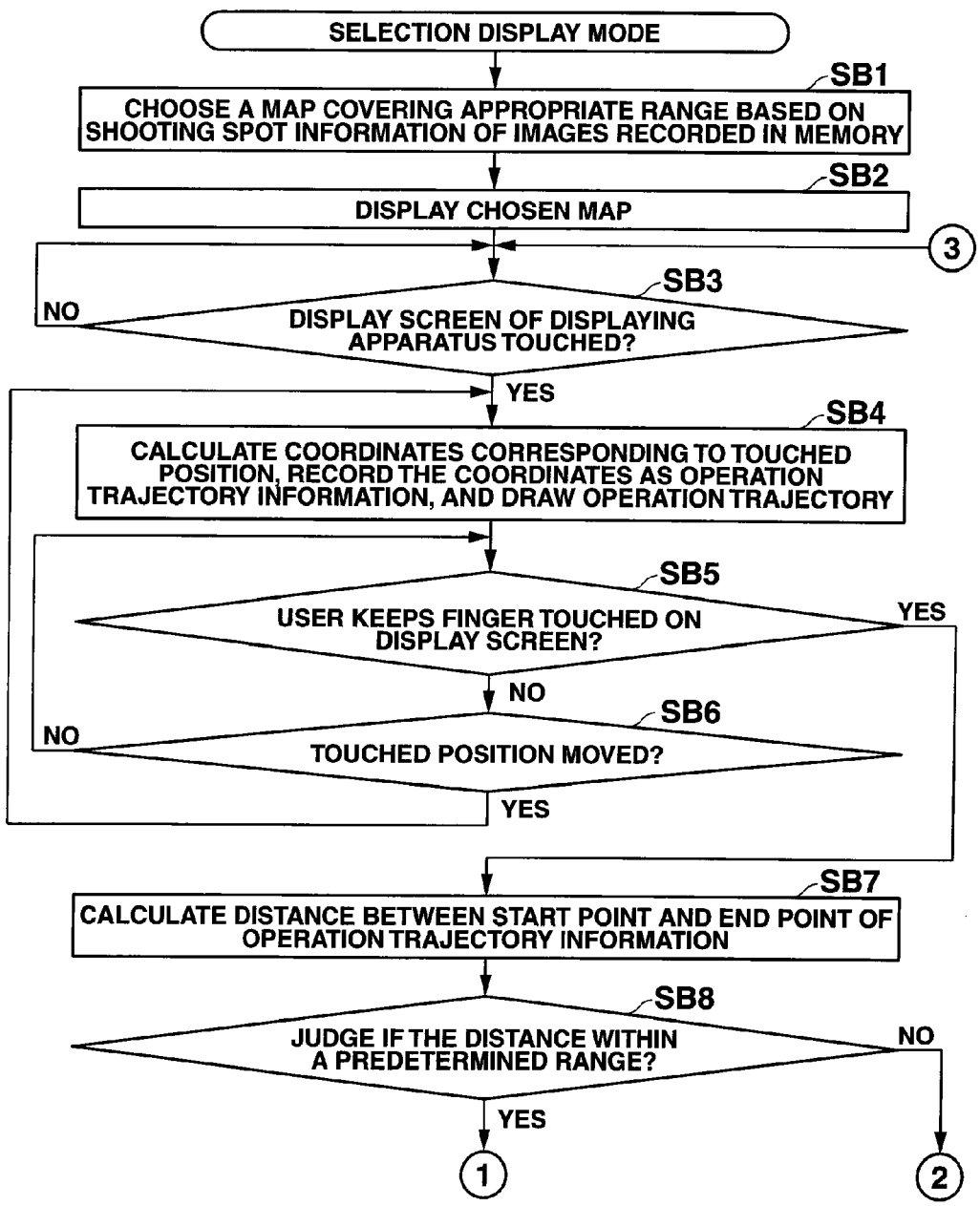
FIGS. 8 and 9 are flow charts showing processes to be performed by DSP/CPU 5 in the selection display mode in a second embodiment.
Figure 9:
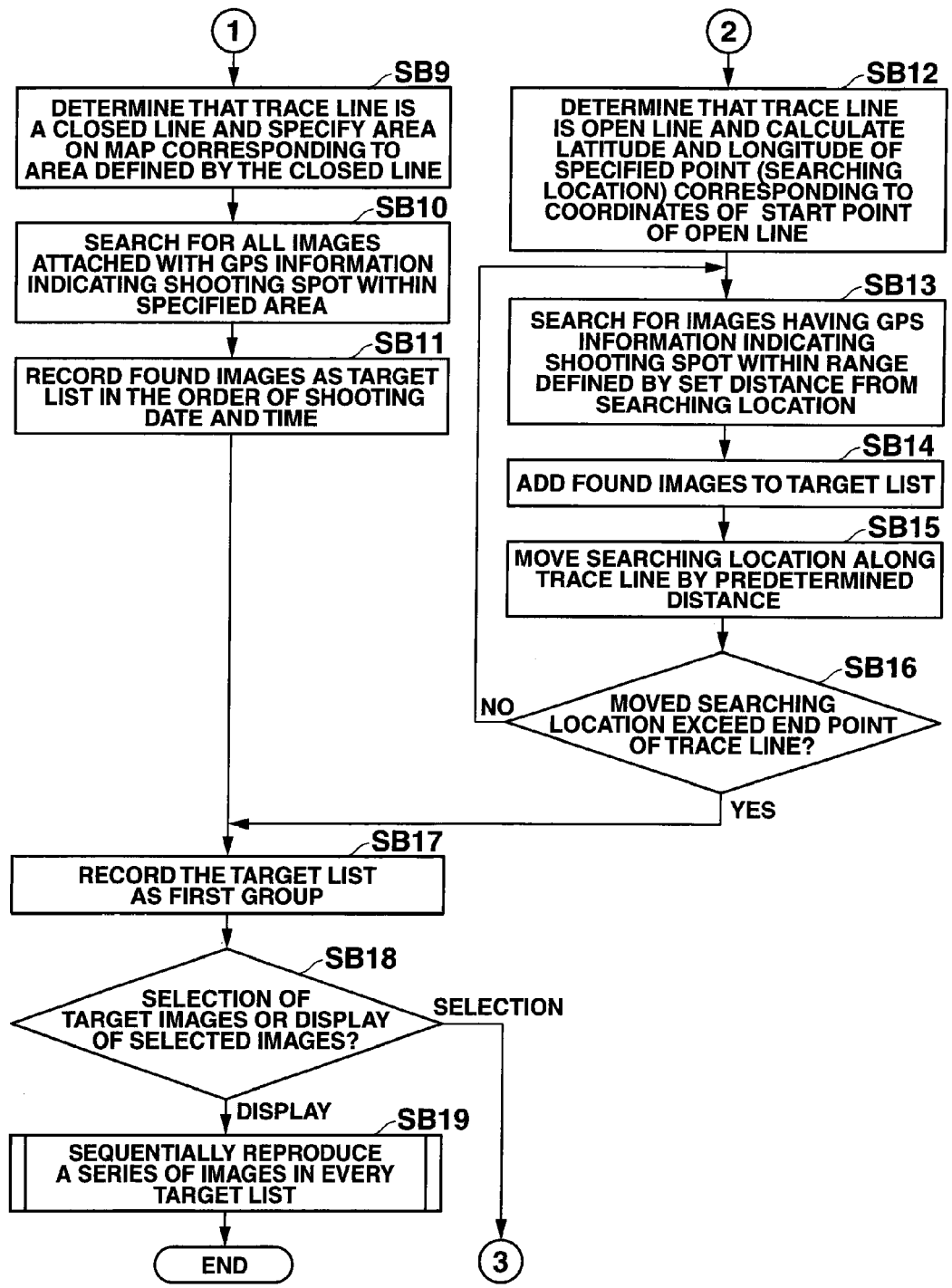

FIGS. 8 and 9 are flow charts showing processes to be performed by DSP/CPU 5 in the selection display mode set by the user in the second embodiment. When the selection display mode is set, DSP/CPU 5 starts its operation to read GPS information attached to all the images (only images in a designated holder and/or images of designated shooting dates and times) recorded in the memory card 15, and selects a map covering an appropriate range including all shooting spots of the images at step SB1 in FIG. 8. Then, DSP/CPU 5 reads from the built-in flash memory 13 (program data recording are) map data of the selected map and displays the map data on the displaying apparatus 6 at step SB2.

When any position on the display screen of the displaying apparatus 6 is touched by the user, that is, when the user touches somewhere on the display screen of the displaying apparatus 6 with his or her finger (YES at step SB3), DSP/CPU 5 calculates coordinates corresponding to the touched position on the display screen of the displaying apparatus 6, and records the calculated coordinates as additional operation-trajectory information indicating an operation trajectory (first operation-trajectory information is recorded at the time when the operation starts) and draws an operation trajectory on the display screen of the displaying apparatus 6 based on the recorded operation-trajectory information at step SB4.

DSP/CPU 5 judges at step SB5 whether or not the user puts his or her finger off the display screen of the displaying apparatus 6 and further judges at step SB6 whether or not the touched position has moved. When it is confirmed at step SB6 that the touched position has moved (YES at step SB6), DSP/CPU 5 returns to step SB4 to calculate coordinates corresponding to the moved touched position, and adds the calculated coordinates as new operation-trajectory information and draws an operation trajectory portion corresponding to the moved touched position on the display screen of the displaying apparatus 6. Thereafter, the processes at steps SB4, SB5 and SB6 are repeatedly performed until it is confirmed at step SB5 that the user has put his or her finger off the display screen of the displaying apparatus 6 (YES at step SB5).

When it is confirmed at step SB5 that the user has put his or her finger off the display screen of the displaying apparatus 6 (YES at step SB5), DSP/CPU 5 calculates a distance in a coordinate space between the first coordinates (start point) and the last coordinates (endpoint) of the operation-trajectory information at step SB7, and judges at step SB8 whether or not the calculated distance falls within a predetermined distance range.

Figure 10A:
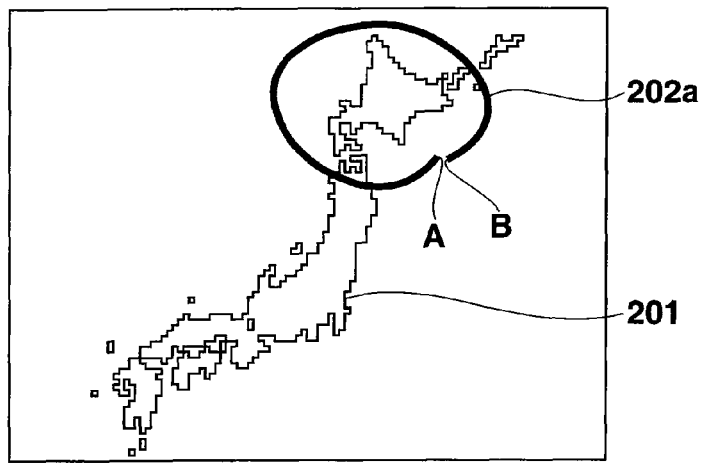
FIG. 10A is a view illustrating a trace line displayed on the display screen of the displaying apparatus 6 in the selection display mode.

The trace line 202a drawn on the display screen of the displaying apparatus 6 based on the operation-trajectory information is illustrated in FIG. 10A. When the calculated distance between the start point and end point of the operation-trajectory information (start point "A" and end point "B" of the trace line 202a) falls within the predetermined distance range (YES at step SB8), DSP/CPU 5 advances to step SB9.

DSP/CPU 5 determines that the trace line 202a is a closed line, and specifies an area on the map corresponding to an area defined by the closed line at step SB9. DSP/CPU 5 searches for all images attached with GPS information indicating the shooting spot falling within the specified area at step SB10. DSP/CPU 5 records file names of the found images as target lists in an internal memory in the order of shooting date and time from the oldest to the latest at step SB11.

The target list recorded in the internal memory is recorded as the first group of target images in the built-in flash memory 13 (setting data recording area) at step SB17. Thereafter, next target list is recorded as a next group of target images.

Further, DSP/CPU 5 waits for an instruction from the user of selecting another target images or an instruction of displaying the selected target images at step SB18. Receiving the instruction of selecting another target images at step SB18, DSP/CPU 5 returns to step SB3 (FIG. 8) and repeatedly performs the processes at steps SB4 to SB7. That is, DSP/CPU 5 successively judges whether or not the user has touched any position on the display screen of the displaying apparatus, thereby confirming if the user starts the drawing operation of a new trace line, again. When the user has started the drawing operation of a new trace line, DSP/CPU 5 records new operation-trajectory information and draws the operation trajectory. When it is confirmed that drawing operation of the operation trajectory has been finished, DSP/CPU 5 calculates the distance in a coordinate space between the first coordinates (start point) and the last coordinates (end point) of the operation-trajectory information (steps SB4 to SB7).

Figure 10B:
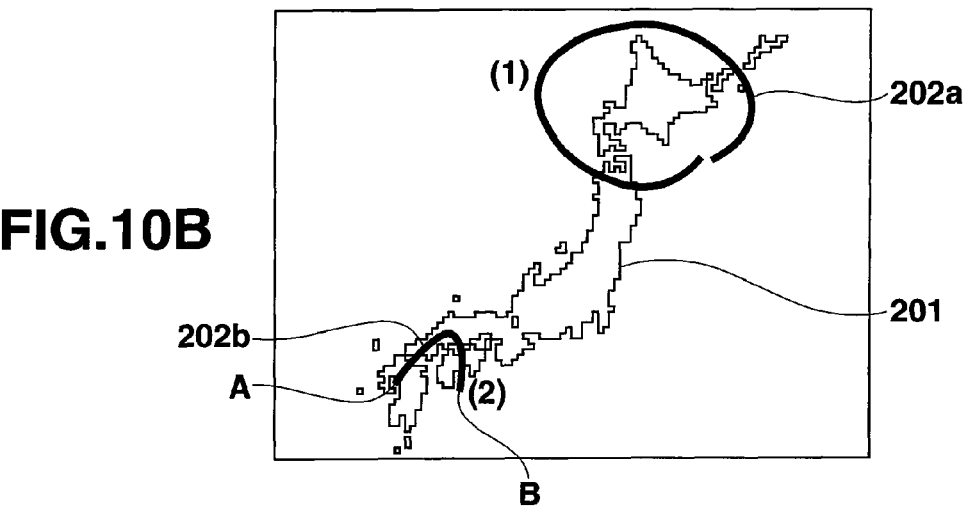
FIG. 10B is a view illustrating trace lines displayed on the display screen of the displaying apparatus 6 in the selection display mode.

When the calculated distance falls within the predetermined distance range (YES at step SB8), DSP/CPU 5 performs the processes at step SB9 to SB18 again, as described above. On the contrary, a trace line 202b drawn on the display screen of the displaying apparatus 6 based on the operation-trajectory information is as illustrated in FIG. 10B, and when the calculated distance between the start point and end point of the operation-trajectory information (start point "A" and end point "B" of the trace line 202b) does not fall within the predetermined distance range (NO at step SB8), DSP/CPU 5 advances to step SB12.

DSP/CPU 5 determines that the trace line 202b is an open line, and sets a specified point on the map corresponding to coordinates of the start point of the open line as a searching location, and calculates the latitude and longitude of the specified point at step SB12. DSP/CPU 5 searches for images attached with GPS information indicating the shooting spot falling within a range defined by the set distance from the searching location (images of shooting spots falling within the range defined by the set distance from the searching location) at step SB13. The set distance is a distance previously determined in accordance with the whole area covered by the map displayed on the displaying apparatus 6 and is used to determine a range having the center at the touched position, within which images are searched for. (The set distance is the same meaning as in the first embodiment.)

File names of the images found at step SB13 are added to the internal memory as a target list (in the case of the first image, a new file name is recorded) at step SB14. When plural images are found at step SB13, file names are recorded in the order of shooting date from the oldest to the latest. When no image has been found at step SB13, the process at step SB 14 is skipped (not shown).

DSP/CPU 5 successively moves the searching location along the trace line (open line) by a predetermined distance in accordance with the drawing operation of the operation trajectory at step SB15. DSP/CPU 5 judges at step SB16 whether or not the moved searching location exceeds the end point of the trace line (open line). When the moved searching location does not exceed the end point of the trace line (open line) (NO at step SB16), DSP/CPU 5 returns to step SB13 to search for images whose shooting spots fall within a range defined by the predetermined distance from the new searching location at step SB13 and adds the found images to the target list at step SB14, and then moves the searching location again at step SB15.

The processes at steps SB13 to SB16 are repeatedly performed until it is determined at step SB16 that the moved searching location exceeds the endpoint of the trace line (open line) (YES at step SB16). When it is determined at step SB16 that the moved searching location exceeds the end point of the trace line (open line) (YES at step SB16), DSP/CPU 5 records (copies) the target list recorded in the internal memory as a next group in the set data recording area of the built-in flash memory 13 at step SB17.

Figure 10C:
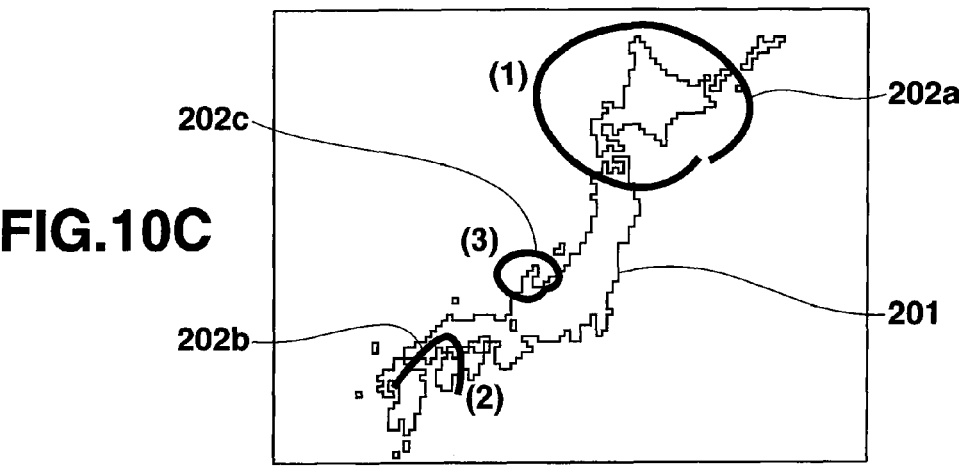
FIG. 10C is a view illustrating trace lines displayed on the display screen of the displaying apparatus 6 in the selection display mode.

When another instruction is given of selecting another target images at step SB18, DSP/CPU 5 returns to step SB3 (FIG. 8) and repeatedly performs the processes at steps SB4 to SB7, whereby another trace line 202c is drawn on the display screen of the displaying apparatus 6, as shown in FIG. 10C. DSP/CPU 5 adds a new target list of target images corresponding to the trace line 202c to the set data recording area of the built-in flash memory 13.

FIG. 11 is a view schematically illustrating the target lists recorded in the set data recording area of the built-in flash memory 13. These target lists are produced in the searching processes performed by DSP/CPU 5 with respect to three trace lines 202a, 202b and 202c drawn on the display screen of the displaying apparatus 6 as shown in FIG. 10C. The target lists 301a, 301b and 301c correspond to the trace lines 202a, 202b and 202c, respectively. The target lists 301a, 301b and 301c each include plural image file names, and are identified with management list numbers "1", "2" and "3", respectively. The target lists 301a, 301b and 301c compose groups of target images and the management list numbers of the groups (target images) indicate the order of display.

In the second embodiment, the order of recording the image file names in each target list indicates the order of displaying images in each group. The order of displaying images in the target lists 301a and 301c corresponding to the trace lines 202a and 202c respectively is equivalent to the order of shooting dates and times from the oldest to the latest, because all the images were shot at shooting spots falling within the areas defined by the closed lines. With respect to the order of displaying images in the target list 301b of the group corresponding to the trace line 202b, the image that was shot at a shooting spot closest to the start point "A" of the trace line (open line) is displayed first and the image that was shot at a shooting spot closest to the end point "B" of the trace line (open line) is displayed last, because the images were shot at shooting spots falling within a range specified by the open line.

The above processes are repeatedly performed until the instruction of displaying the target images is given at step SB18. When the instruction of displaying the target images has been given at step SB18, a series of target images indicated in every target list (that is, included every group) are sequentially reproduced and displayed on the displaying apparatus 6 in the order of producing the target lists at step SB19. More specifically, the images in each target list are displayed on the displaying apparatus 6 each for a predetermined period in the order of the management list number and in the order of recording in each target list. When all the target images have been displayed, all the processes cease in the selection display mode.

As described above, in the second embodiment of the digital camera according to the invention, when the selection display mode is set, the user can easily select only the target images shot at his or her desired locations geographically separate from each other from the images recorded in the memory card 15, simply by moving his or her finger on the map displayed on the display screen of the displaying apparatus 6 to draw a trace connecting his or her desired areas or a trace surrounding his or her desired area.

Further, when drawing the trace to designate plural areas as described above, the user can set the order of displaying images as a unit of the images shot in one area by setting the priority of areas as desired. That is, the user can set the order of displaying groups of images shot in respective areas as desired by setting the priority of such areas as desired. For example, the user can set to display plural images shot in one area prior to displaying plural images shot in other area or after displaying plural images shot in other area. The image displaying order setting operation and the target image selecting operation can be easily performed at the same time.

In the second embodiment, the user can designate his or her desired areas not only by drawing the trace line (open line) connecting these areas, but also by drawing trace lines (closed lines) surrounding these areas. The user is allowed to draw any trace line according to need. It is not always necessary to prepare plural methods for designating user's desired areas. One method out of the above two methods will be enough.

In the second embodiment, the images in the target lists 301a and 301c corresponding to the trace lines 202a and 202c respectively, or the groups of images shot within the areas specified by the operation trajectory (closed line) are displayed in the order of shooting dates and times from the oldest to the latest (order of numerals included in the image file names). But the order of displaying images is not restricted to the above. The order of displaying images may be decided based on information other than information of the drawing order of trance lines (operation trajectories) 202a and 202c. In other words, the order of displaying images may be decided based on any information contained in the data 103 (FIG. 2) attached to the images.

In the second embodiment, a series of selected target images are displayed in the same manner as in the first embodiment and also a list of selected target images may be displayed in the order designated by the user. Further, the digital camera may be arranged to allow the user to select his or her desired image from the displayed list of target images and to display the selected image (whole image display) on the display screen of the displaying apparatus 6 for a predetermined period.

In the selection display mode in the second embodiment of the digital camera, the target image selecting process (including the process for setting the order of displaying target images) and the displaying process of the target images are performed with no time interval therebetween, but the digital camera may be arranged to perform the target image selecting process and the displaying process of the target images separately in response to the user's request. In this case, a target list group (such as a target list 301a, 301b, 301c in FIG. 11) is produced each time the target image selecting process is performed and recorded in the built-in flash memory 13 as a single piece of setting information, wherein the target list group includes information indicating the order of displaying the target images. In the displaying process of the target images, the recorded setting information is read to display the target images.

A modification to the second embodiment of the digital camera will be described. In the second embodiment described above, the user is allowed to draw plural independent trace lines at different locations on the map as shown in FIGS. 10A, 10B and 10C to select the target images. And in the selection display mode, DSP/CPU 5 records trace line information and judges whether the trace line is a closed line or an open line.

Figure 12:
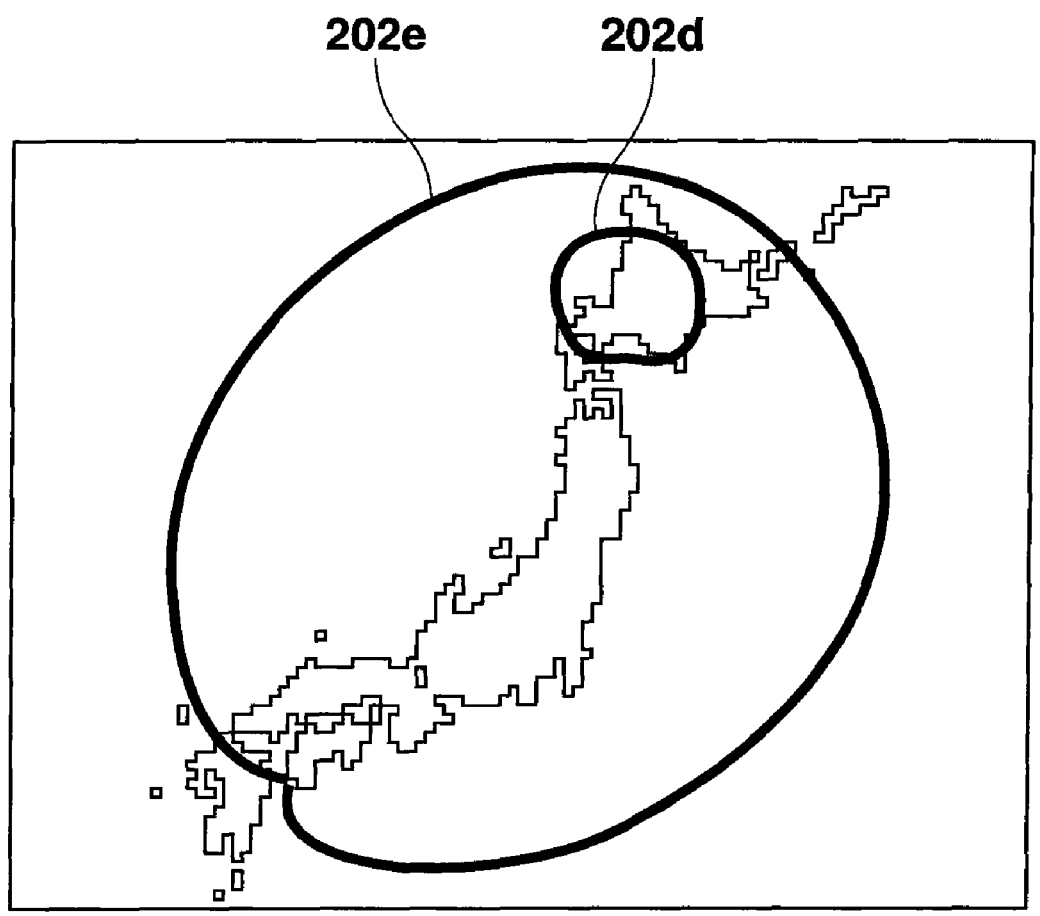
FIG. 12 is a view illustrating designated areas specified in a modification to the second embodiment.

In the modification to the second embodiment, the user is allowed to draw a first trace line 202d and a second trace line 202e surrounding the first trace line 202d at one time, as shown in FIG. 12. When the first trace line 202d and the second trace line 202e have been drawn, DSP/CPU 5 determines that an area defined by the second trace line 202e excluding an area defined by the first trace line 202d is designated by the user, and produces a target list including images shot at shooting locations falling within such determined area. Further, when producing the target list, DSP/CPU 5 gives the images file names the displaying orders determined depending on distances from the first trace line 202d toward the second trace line 202e or the displaying orders determined depending on the shooting dates and times, and records the image file names as target lists, wherein the images shot at shooting locations closer to the first trace line are given higher displaying order.

The above modification to the second embodiment allows the user to easily select only the target images shot at his or her desired shooting spots in plural separate areas excluding specified areas, improving user's friendliness.

In the first embodiment, the second embodiment and the modification to the second embodiment, DSP/CPU 5 may be made to function as second judging means and trace line deleting means to delete the drawn trace lines and/or the recorded target lists. In other words, DSP/CPU 5 is successively made to judge whether a predetermined trace line or a symbol to be easily confirmed such as a mark "X" has been drawn or not while the user is drawing a trace line to specify his or her desired area. In the first embodiment, it is presumed that, even after a trace line has been drawn, the trace line drawing process is being performed until the user gives an instruction. At the time when it is determined that a predetermined trace line has been drawn, the previously drawn trace line (or the previously recorded target list) is deleted in the first embodiment, and all the previously drawn trace lines (or all the target lists produced every group) are deleted at one time in the second embodiment and the modification. In the first embodiment, the second embodiment and the modification to the second embodiment, it is possible for the user to change previously selected target images in a simple manner by drawing a trace line.

In the modification to the second embodiment, when a trace line such as a mark of "X" is drawn on the previously drawn trace line, a trace line drawn in the prior drawing process is deleted and a target list produced with respect to the trace line is deleted. A modification may be made such that, when the mark of "X" is drawn on the previously drawn trace line, the trace line drawn in the prior drawing process is not deleted but only the plural images included in the target list produced with respect to the trace line are deleted.

In the deleting process (including the process in which the plural target images included in the target list are deleted in response to user's key operation), it is possible to delete all the plural target images included in the target list at one time, but the digital camera may be arranged to request the user to perform a key operation to delete another image every time one image has been deleted. Every time the user performs the key operation to delete another image, target images may be deleted one by one in the order indicated in the target list. As described, it is convenient for securing a memory capacity for recording other data in the built-in flash memory to delete target images one by one in response to user's key operation. In this case, the processing order of the target images indicated in the target list may be reversed automatically or in response to user's key operation.

The image process using the target lists produced with respect the operation trajectory can be applied to the image display process and image deleting process described above and also to various processes for processing plural images based on their priorities. In the image processing, the user can easily set images to be processed and processing order simply by drawing an operation-trajectory line on the map.

As described above, in the first embodiment, the second embodiment and the modification to the second embodiment, when the user touches on the display screen of the displaying apparatus 6 to specify his or her desired area, the trace line is displayed to successively indicate an operation-trajectory line. But it may be possible to arrange to display the trace line only at the time when the user has finished specifying his or her desired area. In the second embodiment, the trace line may be displayed at the time when the user has finished specifying the first area. But it may be possible not to display the trace line.

The invention, which is applied to a digital camera, has been described herein, but the invention can be applied to any apparatus having a function that allows the user to specify his or her desired area on the map displayed thereon and that automatically selects images shot at shooting spots falling within the desired area. In other words, the invention can be applied to any apparatus such as a mobile phone with a built-in digital camera and various personal digital assistants with no camera function, and to a personal computer.

What is claimed is:

1. An image processing apparatus comprising:
a display apparatus;
a map displaying unit for displaying a map on the display apparatus;
a determining unit for determining, in response to a drawing operation by a user designating an operation trajectory on the map, (i) a shape of the operation trajectory, and (ii) a start point and an end point of the operation trajectory;
a target image identifying unit for identifying plural images shot within an area as target images, the area being set based on the shape of the operation trajectory determined by the determining unit; and
an order setting unit for setting an order of processing the target images;
wherein the determining unit determines that the shape is open when a distance between the start point and the end point of the operation trajectory is greater than a predetermined distance;
wherein the determining unit determines that the shape is closed when a distance between the start point and the end point of the operation trajectory is less than the predetermined distance;
wherein when the determining unit determines that the shape is open, the order setting unit sets the order of processing the target images based on respective distances of the target images from a location of the start point along the operation trajectory, such that the target images are displayed in list form in order of proximity to the start point; and
wherein the shape of the operation trajectory and the order of processing the target images are determined in a same process responsive to a single continuous drawing operation by the user.

2. The image processing apparatus according to claim 1, wherein, when the determining unit determines that the shape is closed, the order setting unit sets the order of the target images such that the target images are displayed in order based on date information in the list form.

3. The image processing apparatus according to claim 1, wherein:
when the determining unit determines that the shape is open, the area comprises an area within a set distance from the operation trajectory; and
when the determining unit determines that the shape is closed, the area comprises an area contained within the closed shape.

4. The image processing apparatus according to claim 1, further comprising:
a target list recording unit for generating and recording a target list indicating the plural target images set by the target image identifying unit and the order of processing the target images set by the order setting unit; and
a process controlling unit for performing a predetermined process on the plural target images indicated by the target list recorded in the target list recording unit in the order of processing the target images indicated by the target list recorded in the target list recording unit.

5. The image processing apparatus according to claim 4, wherein the predetermined process comprises displaying the plural target images indicated by the target list in the order of processing the target images indicated by the target list.

6. The image processing apparatus according to claim 4, wherein the predetermined process comprises deleting the plural target images indicated by the target list in the order of processing the target images indicated by the target list.

7. The image processing apparatus according to claim 4, wherein the target list recording unit produces and records one target list with respect to one operation trajectory.

8. The image processing apparatus according to claim 4, wherein the process controlling unit separates the display apparatus into a map display area and an image display area, and controls display of the map in the map display area and a list of the target images to be processed in the image display area in the order of processing of the target images.

9. The image processing apparatus according to claim 4, wherein the process controlling unit starts deleting the plural target images indicated by the target list in the order of processing of the target images indicated by the target list, when the operation trajectory has a predetermined trace shape.

10. The image processing apparatus according to claim 1, further comprising a trace line display controlling unit for displaying a trace line indicating the operation trajectory, the trace line being displayed so as to overlap the map displayed on the display apparatus.

11. The image processing apparatus according to claim 10, wherein a line weight of the trace line displayed by the trace line display controlling unit corresponds to the predetermined distance on the map displayed on the map displaying unit in an overlapping manner.

12. The image processing apparatus according to claim 1, further comprising:
- a pointing device for allowing the user to perform the drawing operation to draw the operation trajectory on the map displayed on the display apparatus;
- wherein the display apparatus detects a pointing device pressure applied thereon by the pointing device when the user performs the drawing operation is detected; and
- wherein the plural images identified by the target image identifying unit comprise images which have been captured at locations on the map designated within a range defined by a set distance away from the operation trajectory; and
- wherein the set distance corresponds to the detected pointing device pressure.

13. The image processing apparatus according to claim 1, further comprising:
- an image pick-up unit for shooting an object to obtain an image;
- a position information obtaining unit for obtaining position information indicating a location where the image pick-up unit shot the object; and
- an image recording unit for recording the image obtained by the image pick-up unit in association with the position information obtained by the position information obtaining unit;
- wherein the target image identifying unit identifies, based on the position information associated with the images and recorded in the image recording unit, said images shot within the area as the target images to be subjected to the processing.

14. A method for setting a process order in an image processing apparatus, wherein the image processing apparatus is configured to perform a predetermined process on images and to display data on a display apparatus, and wherein shooting locations of the images are specifiable, the method comprising:

displaying a map on the display apparatus;
determining, in response to a drawing operation by a user designating an operation trajectory on the map, (i) a shape of the operation trajectory, and (ii) a start point and an end point of the operation trajectory;
identifying plural images shot within an area as target images, the area being set based on the shape of the operation trajectory determined by the determining; and
setting an order of processing the target images;
wherein the determining determines that the shape is open when a distance between the start point and the end point of the operation trajectory is greater than a predetermined distance;
wherein the determining determines that the shape is closed when a distance between the start point and the end point of the operation trajectory is less than the predetermined distance;
wherein when the determining determines that the shape is open, the order of processing the target images is set based on respective distances of the target images from a location of the start point along the operation trajectory, such that the target images are displayed in list form in order of proximity to the start point; and
wherein the shape of the operation trajectory and the order of processing the target images are determined in a same process responsive to a single continuous drawing operation by the user.

15. A non-transitory computer readable storage medium having a program stored thereon which controls a computer of an image processing apparatus to function as units comprising:
- a map displaying unit for displaying a map on a display apparatus;
- a determining unit for determining, in response to a drawing operation by a user designating an operation trajectory on the map, (i) a shape of the operation trajectory, and (ii) a start point and an end point of the operation trajectory;
- a target image identifying unit for identifying plural images shot within an area as target images, the area being set based on the shape of the operation trajectory determined by the determining unit; and
- an order setting unit for setting an order of processing the target images;
- wherein the determining unit determines that the shape is open when a distance between the start point and the end point of the operation trajectory is greater than a predetermined distance;
- wherein the determining unit determines that the shape is closed when a distance between the start point and the end point of the operation trajectory is less than the predetermined distance;
- wherein when the determining unit determines that the shape is open, the order setting unit sets the order of processing the target images based on respective distances of the target images from a location of the start point along the operation trajectory, such that the target images are displayed in list form in order of proximity to the start point; and
- wherein the shape of the operation trajectory and the order of processing the target images are determined in a same process responsive to a single continuous drawing operation by the user.

* * * * *